United States Patent
Chundi et al.

(10) Patent No.: US 6,728,932 B1
(45) Date of Patent: Apr. 27, 2004

(54) DOCUMENT CLUSTERING METHOD AND SYSTEM

(75) Inventors: Parvathi Chundi, Cupertino, CA (US); Umeshwar Dayal, Saratoga, CA (US); Mehmet Oguz Sayal, Sunnyvale, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/532,539

(22) Filed: Mar. 22, 2000

(51) Int. Cl.[7] .............................................. G06F 17/00
(52) U.S. Cl. ...................... 715/500; 707/2; 707/104.1
(58) Field of Search ............................. 707/2–4, 104.1; 715/500, 513, 514

(56) References Cited

U.S. PATENT DOCUMENTS

| | | | |
|---|---|---|---|
| 5,278,980 A | * 1/1994 | Pedersen et al. | 707/4 |
| 6,317,787 B1 | * 11/2001 | Boyd et al. | 709/224 |
| 6,457,028 B1 | * 9/2002 | Pitkow et al. | 715/513 |
| 6,562,077 B2 | * 5/2003 | Bobrow et al. | 715/517 |

OTHER PUBLICATIONS

Robert Cooley, Pang–Ning Tan, Jaideep Srivastava, Web-SIFT: The Web Site Information Filter System, Jun. 13, 1999.*

Douglass R. Cutting, David R. Karger, Jan O. Pedersen, John W. Tukey, Scatter/Gather: A Cluster–based Approach to Browsing Large Document Collections, 1992, Proc. 15th Annual Int. ACM SIGIR Conf. on Research & Development in Information Retrieval.*

* cited by examiner

Primary Examiner—Joseph H. Feild
Assistant Examiner—James H Blackwell

(57) ABSTRACT

Document clustering method and system utilizing both the log-based clustering method and the content-based clustering method are disclosed. The method includes the steps of generating log-based document clusters and combining vectors from the log-based document clusters with individual document clusters for content-based clustering analysis. The log-based document clusters are generated by accessing the retrieval session log, clustering the retrieval sessions, and combining the documents opened during each of the sessions of session clusters.

4 Claims, 4 Drawing Sheets

DOCUMENT CLUSTERING METHOD AND SYSTEM

FIELD OF THE INVENTION

The present invention relates generally to document clustering techniques. More specifically, the present invention relates to document clustering techniques incorporating both content-based and log-based methods to produce clusters that incorporate users' perspective.

BACKGROUND OF THE INVENTION

Information retrieval systems are concerned with locating documents relevant to a user's information need from a collection of documents. The user describes his information need using a query consisting of a number of words. The information retrieval systems compare the query with the documents in the collection and return the documents that are likely to satisfy the information need.

Document clustering is often used to increase the efficiency and effectiveness of the information retrieval systems. Clustering involves the grouping of similar or otherwise related documents. In the context of information retrieval, document clustering identifies groups of similar documents, usually on the basis of terms that the documents have in common. Closely associated documents tend to be relevant to same queries or requests. Therefore, clustering of documents increases efficiency of the information retrieval systems. Further, clustering of documents also aids in browsing of the document collection. Related documents can be co-located to enhance browsing.

Cluster analysis methods are usually based on measurements of similarity between objects, these objects being either individual documents or clusters of documents. Traditionally, interdocument similarity was determined by analyzing the contents of the documents. The content-based clustering method assumes that documents are represented by lists of manually or automatically assigned terms, keywords, phrases, indices, or thesaural terms that describe the content of the documents.

Because the content-based clustering approach analyzes each and every document to be clustered, the result is complete and stable. Using the content-based clustering approach, the entire collection of the documents can be clustered, and the clusters do not change as long as the document collection and the keywords do not change.

The content-based clustering method is widely used on the Internet as a method of organizing information. Ever-increasing amount of information is becoming available via the Internet and the World Wide Web (the "Web"). However, because of the decentralized nature of the information presented, it is becoming increasingly difficult for a user to find relevant information regarding a particular subject. To assist the user to locate relevant information on the Web, many portal sites maintain directories built upon content-based clustering of the web pages.

Portals are Internet sites that organize, or categorize web pages into various topics and offer topic-based or keyword-based organization of the web pages to the user. However, because the portals' topics and the keywords are determined by the portal providers, the topics, the keywords, or the assignment of the web pages to these topics or keywords do not reflect the perspectives and the interests of the users. In fact, the users may find the portals' organization or clustering of the web pages to be stifling and non-sensible.

Additionally, the organization of the web pages into the portals' topics and categories cannot account for differences between different demographic groups of users. For example, people of different ages, gender, or occupations are likely to prefer different categorization and clustering of the web pages. Unfortunately, regardless of the users' preferences, the portals offer the same categorization of the web pages as generated by the portal providers. Some portals offer facilities for the user to "customize" the portal. However, these facilities typically provide limited functions for the user to select, from the already-determined topics and categories, which topics and categories to display when the user links to the portal. And, typically, these customization facilities do not allow users to create customized topics or categories, or to assign web pages to certain categories for customized clustering of the web pages.

Further, the content-based clustering method, because of its static nature, cannot adapt to changing preferences of the users and the addition of new topics, categories, or areas of interest.

To overcome some of the shortcomings of the content-based clustering method, log-based clustering technique has been proposed. Recently, it has been shown that documents can be clustered based on retrieval system logs maintained by an information retrieval system such as web server access logs. Using web server access logs, it has been shown that similar pages tend to be accessed together by users. Under the log-based clustering method, the interdocument similarity can be based upon whether the documents were accessed together during retrieval sessions by the user.

Since the clustering of documents for each user is based on retrieval system logs, documents (e.g., Web pages) that users found to be similar fall into the same cluster, thereby reflecting the "similarity notion" of users. As user access patterns change, the clusters will also change giving the clusters a "dynamic" nature. And, since the log-based clustering method can be based on recent retrieval system logs for each user, the clustering can adopt to the changing tastes and perspective of the user.

However, the log-based clustering method produces document clusters which are inherently incomplete. This is because the log-based clustering method clusters only those documents that are accessed by some users. In an environment like the Internet where millions upon millions web pages exist, only a tiny portion would be clustered under the log-based clustering method. The remaining web pages are not clustered at all.

Accordingly, there remains a need for a document clustering method that incorporates users' perspective while accounting for documents not accessed by the user and that overcomes the disadvantages set forth previously.

SUMMARY OF THE INVENTION

According to one aspect of the present invention, a method for clustering documents is disclosed. The documents are represented in a hybrid matrix, and the hybrid matrix is clustered by a content-based clustering algorithm. There is one vector per document in the hybrid matrix. For those documents that are accessed in the session logs, a log-based document clustering vector is constructed in the hybrid matrix. For all other document, a vector based on keywords is constructed.

To form the log-based cluster document vector, a corresponding log-based cluster document must be generated. The log-based cluster document is generated by accessing retrieval session logs and clustering them into session clusters. Then, the log-based cluster document is generated for each session cluster by concatenating the documents that were opened during the sessions in that session cluster.

According to another aspect of the present invention, an apparatus for clustering documents includes storage for storing retrieval session logs and a processor, connected to the storage, for performing the steps of the present invention. The apparatus may further include memory, connected to the processor, for storing intermediate results including the hybrid matrix. The storage and the memory is preferably machine readable memory devices encoded with data structure for clustering documents including the hybrid matrix, retrieval session logs, and the instructions for the processor.

Other aspects and advantages of the present invention will become apparent from the following detailed description, taken in conjunction with the accompanying drawings, illustrating by way of example the principles of the present invention.

DESCRIPTION OF A PREFERRED EMBODIMENT

Figure 1:
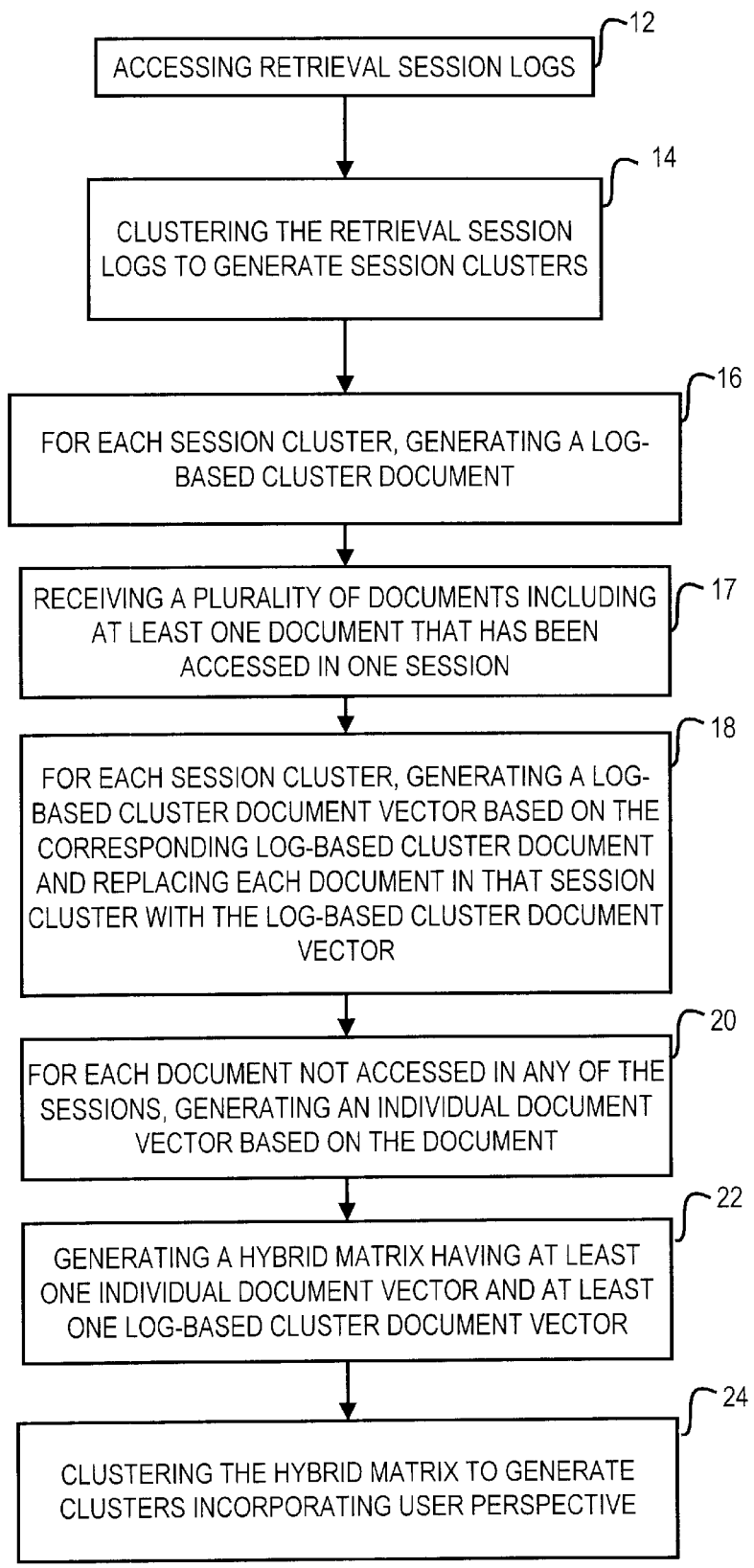
FIG. 1 is a flow chart illustrating a preferred method of clustering documents according to the present invention.

As shown in the drawings for purposes of illustration, the present invention is embodied in a novel hybrid clustering method and system for clustering a collection of documents while accounting for the users' tastes and perspectives on the documents to be clustered.

The content-based clustering method clusters the entire collection of documents based upon topics or keywords. However, the users do not participate in the selection of the topics and the keywords or the clustering process. Therefore, clustering may be of limited use to various groups of users having variety of perspectives or interests. The log-based clustering method clusters documents based upon retrieval session logs of the users. Accordingly, the resulting document clusters may be highly relevant and useful for users. However, the log-based clustering method provides for clustering of only those documents already accessed by some users. Therefore, the clustering is inherently incomplete. The present invention combines the advantages of both clustering techniques to produce a customized, relevant clustering of documents encompassing the entire collection of documents.

The present invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well-known or conventional details are not described in order to avoid obscuring the present invention in unnecessary detail. In the drawings, the same element is labeled with the same reference numeral.

Generate Log-based Document Cluster

Figure 2:
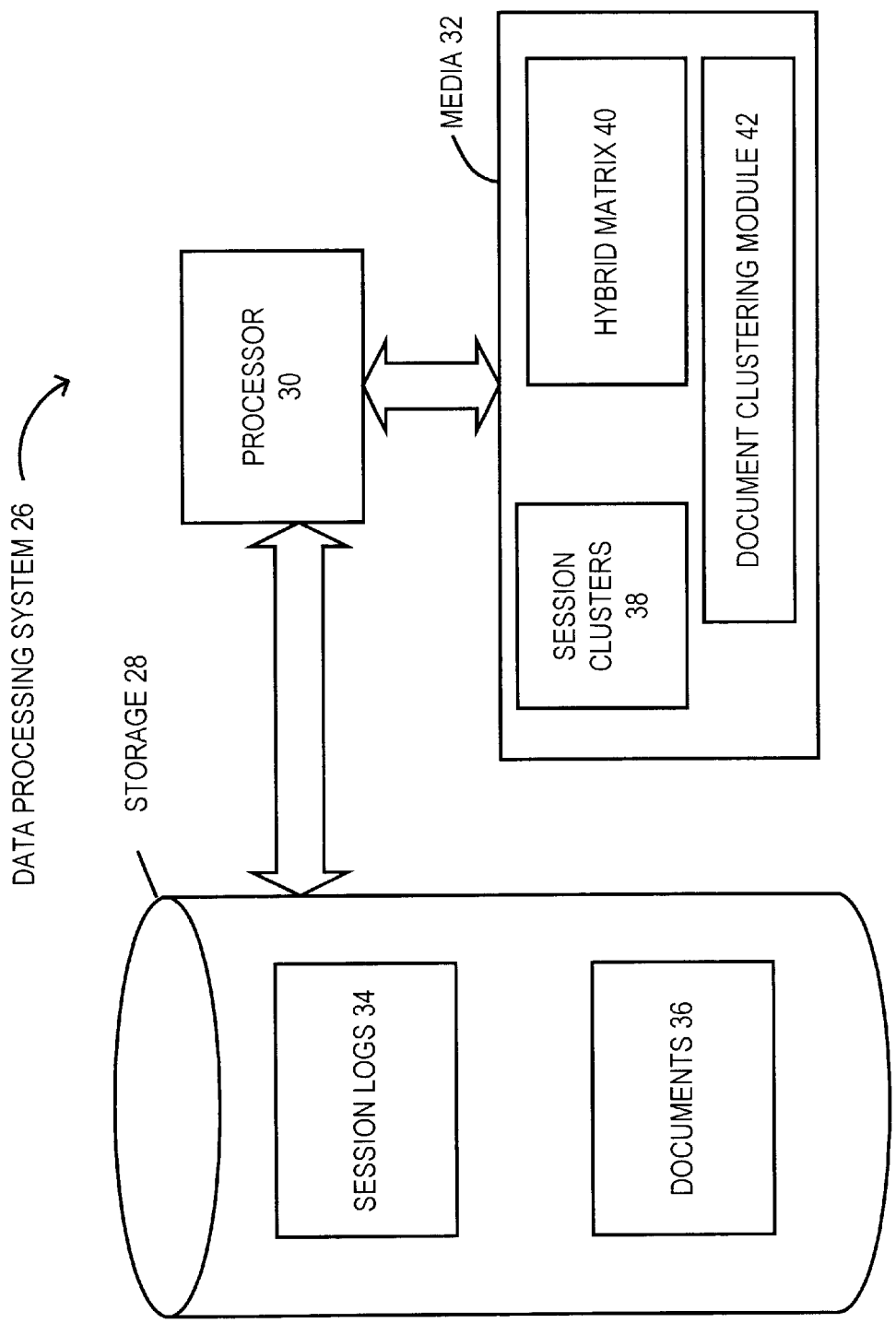
FIG. 2 is a block diagram illustrating a data processing system in which the document clustering method and system according to the present invention can be implemented.
Figure 3:
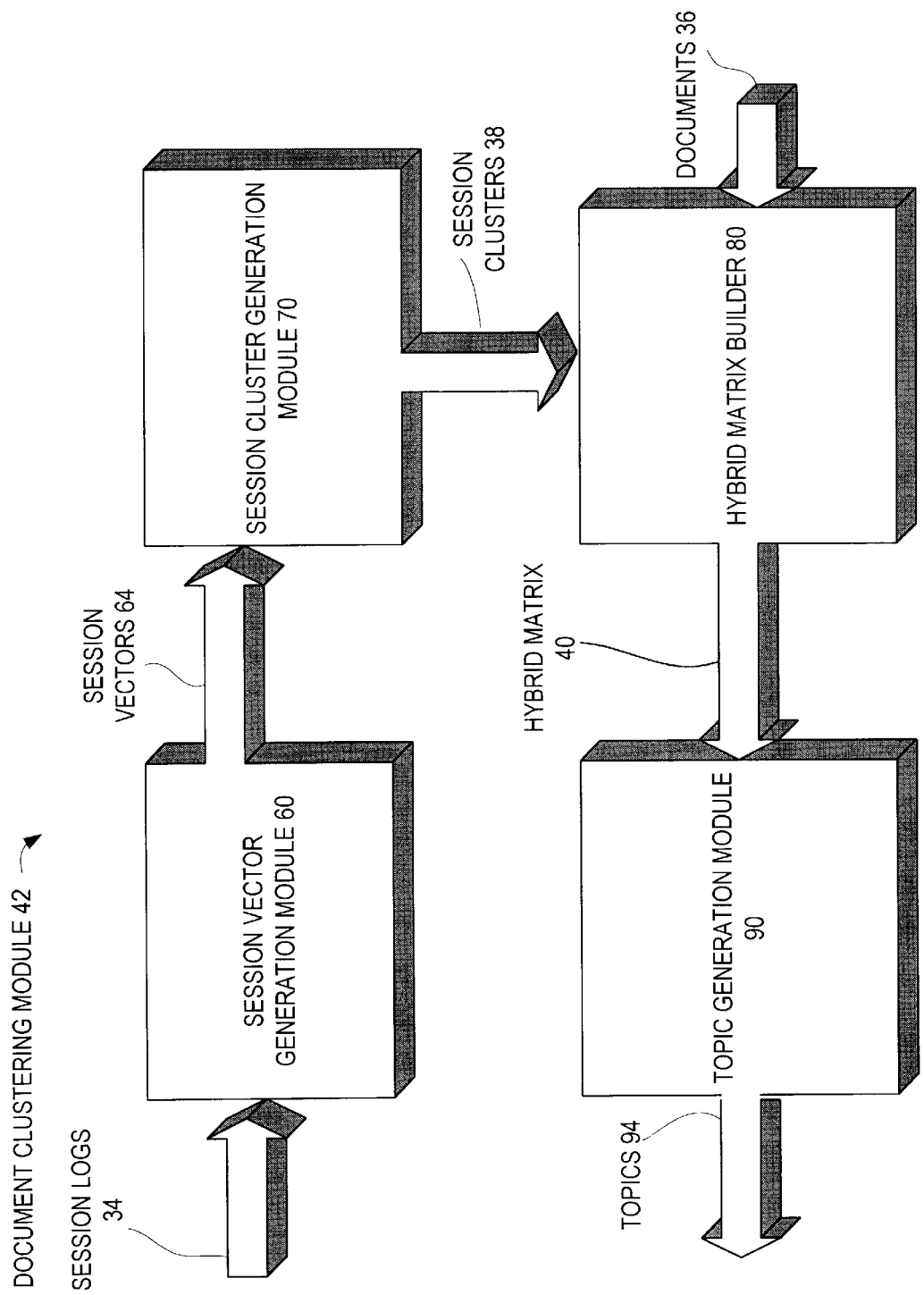
FIG. 3 is a block diagram illustrating in greater detail the document clustering module of FIG. 2.
Figure 4:
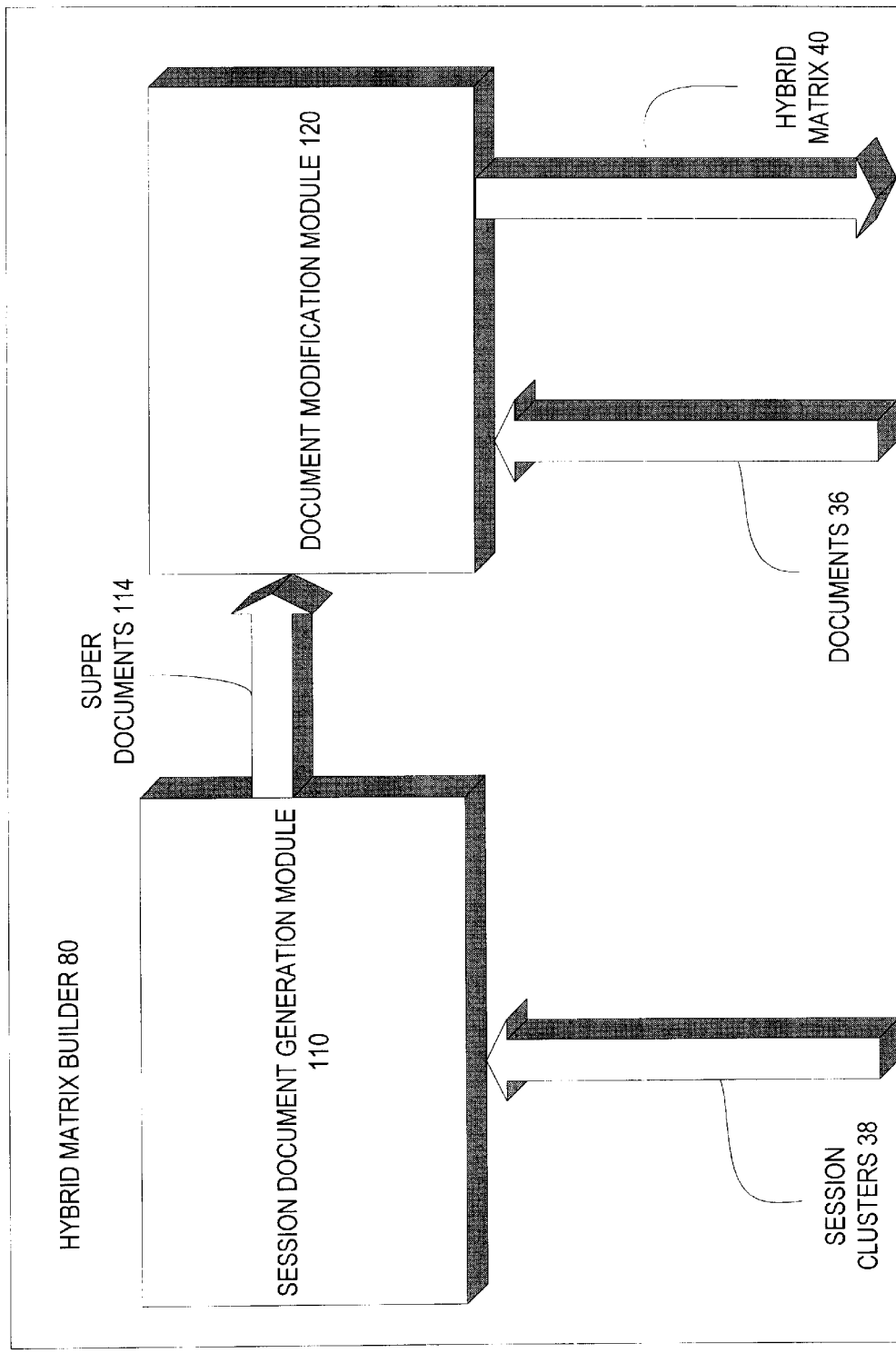
FIG. 4 is a block diagram illustrating in greater detail the hybrid matrix builder of FIG. 3.

FIG. 1 is a flowchart illustrating a preferred method of clustering documents according to the present invention. FIG. 2 is a diagram illustrating a data processing system 26 configured to cluster documents according to the present invention. FIG. 3 is a block diagram illustrating in greater detail the document clustering module 42 of FIG. 2. FIG. 4 is a block diagram illustrating in greater detail the hybrid matrix builder 80 of FIG. 3. The following discussion refers to FIGS. 1–4.

To clearly explain the present invention, assume that there is a collection, D, of documents to be clustered. The collection D has N number of documents with each document identifiable as di where i is an indexing number between 0 and N and where dn is the last document. On the Internet, the value of N may be very large and easily exceed many millions. Also assume that the collection D is accessible to a user via the information retrieval system which keeps a log of the user's retrieval sessions.

Retrieval session logs 34 are typically kept on a storage device 28 of a web server or another information retrieval system. The first step, indicated by block 12, is to access retrieval session logs (e.g., session logs 34 of FIG. 3). The storage 28 may also contain the collection D of the documents 36 to be clustered. Each retrieval session log 34 contains the query used to retrieve documents, number of documents found to satisfy the query, and a list of documents opened by the user. The document retrieved and read by the user is referred to as an opened document. TABLE 1 below illustrates M sample retrieval session, each of which is denoted sj where the value of j is denotes the $j^{th}$ session, qj denoting the query used for the $j^{th}$ session, rj denoting the number of retrieved documents at the $j^{th}$ session, and the list of documents opened during the session; the last session is denoted sm:

TABLE 1

| Session | Query Used | No. of docs. found | Opened Document List | | |
|---|---|---|---|---|---|
| s1 (session 1) | q1 | R1 | d1 | d5 | d6 |
| s2 | q2 | R2 | d2 | d4 | d17 d78 |
| s3 | q3 | R3 | d5 | d6 | |
| ... | | | | | |
| Sm | qm | Rm | d4 | d17 | |

In addition to the opened document list, other factors may be used to rank the relevance of documents in the logs. For example, the length of time that a document was opened may indicate that the document is more relevant to the corresponding query. Also, the last document opened for review by the user may be ranked higher in the relevance because it may be assumed that the last document opened contained the information the user was seeking.

It has been shown that, in the case of web servers, web pages accessed in the same user session tend to be related. And, if two retrieval sessions are related, then the documents accessed in those retrieval sessions are also related. Accordingly, to generate log-based document clusters, the retrieval sessions are first clustered into session clusters, as indicated by block 14.

To cluster retrieval sessions, the retrieval sessions are first represented in a manner suitable for applying a clustering algorithm. To cluster retrieval sessions, session vector matrix is generated. For example the session vector matrix is represented in FIG. 3 by "sessions vectors 64." In the session vector matrix, each session is represented as P-dimensional vector where P is a parameter value. Each retrieval session is then converted to a Boolean vector in the P-dimensional space. That is, the Boolean vector corresponding to a retrieval session sj contains a 1 for the $p^{th}$ dimension if the document corresponding to the $p^{th}$ dimension is included in the list of opened documents for session sj. The value of P can be any number. In the preferred embodiment, the value P is the number of unique documents opened for all of the retrieval sessions under consideration. In an extreme case, if all of the documents in the collection of documents were opened during at least one retrieval session, then the value of P is equal to the value of N (the number of documents in the collection of documents). However, this is an unlikely event in practice.

For example, if TABLE 1 were to reflect all the documents opened during all the retrieval sessions, then TABLE 2 below represents all of the session vector matrix. Here, the value of P is seven (7) because there were seven (7) unique documents opened during all of the retrieval sessions.

TABLE 2

| $P^{th}$ dimension → | 1 | 2 | 3 | 4 | 5 | 6 | 7 |
|---|---|---|---|---|---|---|---|
| Document id → | d1 | d2 | d4 | d5 | d6 | d17 | d78 |
| s1 (session 1) vector | 1 | 0 | 0 | 1 | 1 | 0 | 0 |
| s2 vector | 0 | 1 | 1 | 0 | 0 | 1 | 1 |
| s3 vector | 0 | 0 | 0 | 1 | 1 | 0 | 0 |
| sm vector | 0 | 0 | 1 | 0 | 0 | 1 | 0 |

Each data row of TABLE 2 represents a Boolean session vector for a retrieval session. The session vectors are Boolean vectors because each element of the session vectors is a Boolean value reflecting whether or not the corresponding document was opened during that session. In the example of TABLE 2, during session s1, documents d1, d5, and d6 were opened. Therefore, the session vector for s1 includes a Boolean 1 for the vector positions corresponding to the documents d1, d5, and d6, and a Boolean 0 for all other vector positions.

Then, the session vector matrix, represented here by TABLE 2, is clustered using a standard clustering algorithm to cluster similar or related sessions. In the example, for the purposes of further illustration, assume that sessions s1 and s3 are clustered together forming session cluster S(1,3) and sessions s2 and sm are clustered together forming session cluster S(2,m). Note that during each of the sessions s1 and s3, the documents d5 and d6 were opened. And, during each of the sessions s2 and sm, the documents d4 and d17 were opened. Session clusters are referred to in FIG. 3 as "session clusters 38."

The log-based document clusters are then formed for each session cluster by combining all of the documents opened during any of the sessions of the session cluster. This step is represented by block 16. For example, the log-based document cluster for session cluster S(1,3) is a combination of the documents d1, d5, and d6 because these three documents were opened at least once during sessions s1 or s3 which form the session cluster S(1,3). Likewise, for session cluster S(2,m), the log-based document cluster is a combination of documents d2, d4, d17, and d78. In the preferred embodiment, the combination of documents is formed by concatenating the documents. Accordingly, in the preferred embodiment, the log-based document cluster is a "super document" (referred to in FIG. 4 as "super documents 114") that is a concatenation of its component documents.

For convenience, the log-based document cluster combining documents d1, d5, and d6 is referred to as G(1,5,6), and the log-based document cluster combining documents d2, d4, d17, and d78 is referred to as G(2,4,17,78). And, the set of all documents, which have been combined to a log-based document cluster, will be referred to as set L. In the example, set L comprises documents d1, d2, d4, d5, d6, d17, and d78.

Content-based Clustering Using Log-based Document Cluster Vectors

At this stage, the collection D of all documents can be categorized into one of two broad categories. First, there are documents, which have been combined into one or more log-based document clusters. These are the documents belonging to set L. Second, there are documents, which have not been combined into any of the log-based document clusters because they were not opened during any of the retrieval sessions. These documents can be grouped into a set denoted D−L (collection D minus set L).

Then, the collection D of all documents can be clustered using the standard content-based clustering technique using a hybrid matrix comprising document vectors and log-based document cluster vectors as follows. For each of the documents in set D−L, a standard document vector is generated. Assume, for the purposes of illustration, that the content-based clustering is to be performed over a set of keywords, W, having T members where T is a natural number. Then, for each of the documents in the set D−L, a T-dimensional document vector is generated. This step illustrated by block 20.

However, for each of the documents in the set L, a T-dimensional vector generated from the log-based document cluster to which the document was combined. This step is illustrated by block 18. Since the log-based document clusters are documents themselves, the vectors are generated the same way the vectors are generated for any document.

Continuing with the example, the documents d1, d5, and d6 were combined to form the log-based document cluster G(1,5,6), and documents d2, d4, d17, and d78 were combined to form the log-based document cluster G(2,4,17,78). Then, documents d1, d2, d4, d5, d6, d17, and d78 are members of the set L. All other documents are members of the set D−L. Clusters G(1,5,6) and G(2,4,17,78) are "larger" documents formed from their respective components.

The individual document vectors for the documents of the set D−L and the log-based document cluster vectors are combined to form a hybrid matrix of vectors. Step 22. For the documents belonging to set D−L, standard document vectors are generated. For each of the documents belonging to set L, the corresponding log-based document cluster vector is used in its place. TABLE 3 below illustrates the hybrid matrix formed in accordance with the present example.

TABLE 3

| | KEYWORDS | | | | | |
|---|---|---|---|---|---|---|
| Documents | w1 | w2 | w3 | w4 | *** | wq |
| d1 (G(1,5,6) vector) | | | | | | |
| d2 (G(2,4,17,78) vector) | | | | | | |
| d3 document vector | | | | | | |
| d4 (G(2,4,17,78) vector) | | | | | | |
| d5 (G(1,5,6) vector) | | | | | | |
| d6 (G(1,5,6) vector) | | | | | | |
| d7 document vector | | | | | | |
| d8 document vector | | | | | | |
| *** | | | | | | |
| d16 document vector | | | | | | |
| d17 (G(2,4,17,78) vector) | | | | | | |
| d18 document vector | | | | | | |

TABLE 3-continued

| | KEYWORDS | | | | |
|---|---|---|---|---|---|
| Documents | w1 | w2 | w3 | w4 *** | wq |
| *** | | | | | |
| d77 document vector | | | | | |
| d78 (G(2,4,17,78) vector) | | | | | |
| d79 document vector | | | | | |
| *** | | | | | |
| Dn document vector | | | | | |

In TABLE 3, each row is a vector, and the entire table represents the hybrid matrix. The hybrid matrix (referred to as hybrid matrix 40 in FIGS. 3 and 4) is clustered using a content-based clustering method. For each of the documents (e.g., documents 36 in FIGS. 3 and 4) *belonging to the set D–L (these are the documents that were not opened during any retrieval session), a document vector is generated and used. This step is illustrated by block 20. Since each of the document vectors of the documents in the set D–L represents an individual document, these document vectors can be referred to as individual document vectors. In TABLE 3, document vectors for the following documents are illustrated as individual document vectors: d7, d8, d16, d18, d77, d79, and dn.

For the documents belonging to set L (documents opened during a retrieval session), individual document vectors are not used. Instead, a vector generated from the log-based document cluster to which the document has been combined is used. In the example, document d1 was combined into the log-based document cluster G(1,5,6). Therefore, a vector generated for G(1,5,6) is used in place of d1. In fact, the log-based document cluster vector for G(1,5,6) is used for each of the documents d1, d5, and d6.

It is important that the session clusters be represented in such a way so that when documents (both those accessed in sessions and those not accessed in sessions) are clustered using a content based clustering method, user preference is reflected in the resulting clusters. In the preferred embodiment, all the documents of a session are represented in such a way so that the Euclidean distance of all documents in the same session is made to be the same when a content-based cluster is applied to the hybrid matrix. By making the Euclidean distance the same, the present invention ensures that documents of the same session are clustered together in the same content-based cluster in order to reflect user perspective. Alternatively, other methods can be used to represent all documents in the same session so that the Euclidean distance between these documents is the same or has a minimal differences so that the documents from the same session are clustered when a content based clustering method is applied, thereby providing user perspective in the clustering.

It is noted that in the prior art, the output of a log-based clustering method is inherently not suitable as an input to a content based clustering method. In contrast, the present invention provides a novel method of representing the output of a log-based clustering method in such a manner so that not only is the output of the log-based clustering method suitable as an input to content based clustering, but the representation also provides user perspective to the content based clustering method.

In other words, the log-based cluster document vectors provide both user perspective, by clustering all the documents of a session together, and content so that a content based method clusters other documents with similar content to these documents.

When the hybrid matrix is complete 22, in processing step 24, the content-based clustering technique is applied to cluster the documents of the collection D.

To summarize, in accordance with one embodiment of the present invention the following steps are performed. In step 12, session logs are received. In step 14, the session logs are clustered into session clusters. In step 16, a log-based cluster document is generated for each session cluster. In step 17, a plurality of documents that includes at least one document that has been accessed in one session is received.

In step 18, for each session cluster, a log-based cluster document vector is generated based on the corresponding log-based cluster document, and each document in that session cluster is replaced with the log-based cluster document. In step 20, for each document not accessed in any of the sessions, an individual document vector based on the document is generated. In step 22, a hybrid matrix that has at least one individual document vector and at least one log-based cluster document vector is generated. In step 24, the hybrid matrix is clustered to generate clusters that incorporate user perspective.

FIG. 2 is a block diagram illustrating a data processing system 26 in which the document clustering method and system according to the present invention can be implemented. In the preferred embodiment, a system for clustering documents in accordance with the present invention is implemented in a computing machine 26 having storage 28 for maintaining user retrieval session logs 34. The storage 28 may also contain the documents 36 to be clustered. A processor 30, connected to the storage 28, can be programmed to perform the steps illustrated by the flow chart of FIG. 1 and discussed in detail herein above. Specifically, processor 30 can be programmed to perform the steps of accessing the retrieval session logs 34, clustering the retrieval sessions into session clusters, generating the log-based document clusters, generating the hybrid matrix by generating vectors for the documents of the set D–L and for the log-based document clusters, and clustering the documents based on the hybrid matrix. In order to perform these tasks, the processor 30 may be connected to media 32 for holding the session clusters 38 or the hybrid matrix 40. The media 32 may also include the document clustering module 42 including instructions, which when executed, cause the processor 30 to perform the steps of the present invention.

The media 32, having the document clustering module 42, may be incorporated in office equipment (e.g., a computer) or separate from office equipment. When incorporated in office equipment, the media 32, having the document clustering module 42 embodied therein, can be in the form of a volatile or non-volatile memory (e.g., random access memory (RAM), read only memory (ROM), etc.). When incorporated separate from the office equipment, the media 32, having the document clustering module 42 embodied therein, can be in the form of a computer-readable medium, such as a floppy disk, compact disc (CD), etc.

FIG. 3 is a block diagram illustrating in greater detail the document clustering module 42 of FIG. 2. In accordance with one embodiment of the present invention, the document clustering module 42 includes a session vector generation module 60, a session cluster generation module 70, a hybrid matrix builder 80, and a topic generation module 90.

The session vector generation module 60 receives session logs 34 and based thereon generates session vectors 64. The session cluster generation module 70 is coupled to the session vector generation module 60 for receiving the session vectors 64, and based thereon, generates session clusters 38 (see steps 12 and 14 of FIG. 1).

The hybrid matrix builder 80 is coupled to the session cluster generation module 70 for receiving the session clusters 38, receives documents 36, and based thereon, generates a hybrid matrix 40. For example, the hybrid matrix builder 80 can perform steps 16 through 22 of FIG. 1. The hybrid matrix builder 80 is described in greater detail hereinafter with reference to FIG. 4.

The topic generation module 90 is coupled to the hybrid matrix builder 80 for receiving the hybrid matrix 40, and based thereon, generates topics 94 (i.e., clusters incorporating users' perspective) (see step 24 of FIG. 1).

FIG. 4 is a block diagram illustrating in greater detail the hybrid matrix builder 80 of FIG. 3. In accordance with one embodiment of the present invention, the hybrid matrix builder 80 includes a session document generation module 110 and a document modification module 120. The session document generation module 110 is coupled to the session cluster generation module 70 for receiving the session clusters 38, and based thereon, generates super documents 114. The document modification module 120 is coupled to the session document generation module 110 for receiving the super documents 114. The document modification module 120 also receives the documents 36, and based on these inputs, generates the hybrid matrix 40.

Although specific embodiments and alternatives of the present invention have been described and illustrated, the invention is not to be limited to the specific forms of arrangements of parts so described and illustrated. The Claims alone, not the preceding Summary or the Description of the Preferred Embodiment, define the invention.

What is claimed is:

1. A method for clustering documents comprising:

generating a hybrid matrix of vectors comprising a first vector representing a first document and a second vector representing a log-based document cluster; and clustering the documents using the hybrid matrix, wherein the step of generating the hybrid matrix comprises:

accessing retrieval session logs;

clustering retrieval sessions into session clusters;

generating, for each session cluster, a log-based document cluster by combining all documents opened during any retrieval session of the session cluster;

generating a log-based document cluster vector for each of the log-based document clusters;

replacing each document in the log-based document cluster with the log-based document cluster vector;

generating an individual document vector for each document not opened during any retrieval session; and combining the log-based document cluster vector and the individual document cluster vector, wherein the log-based document cluster is formed by concatenating the documents to be combined.

2. The method recited in claim 1 wherein the second vector is used in place of a second document within the hybrid matrix wherein the second document forms a portion of the log-based document cluster.

3. The method recited in claim 1 wherein the step of clustering the documents using the hybrid matrix is performed using a content-based clustering technique.

4. The method recited in claim 1 wherein the step of clustering retrieval sessions into session clusters comprises the steps of:

generating a Boolean session vector for each retrieval session;

forming a matrix of the Boolean session vectors; and applying a clustering algorithm to the matrix of the Boolean session vectors.

\* \* \* \* \*